UNITED STATES PATENT OFFICE.

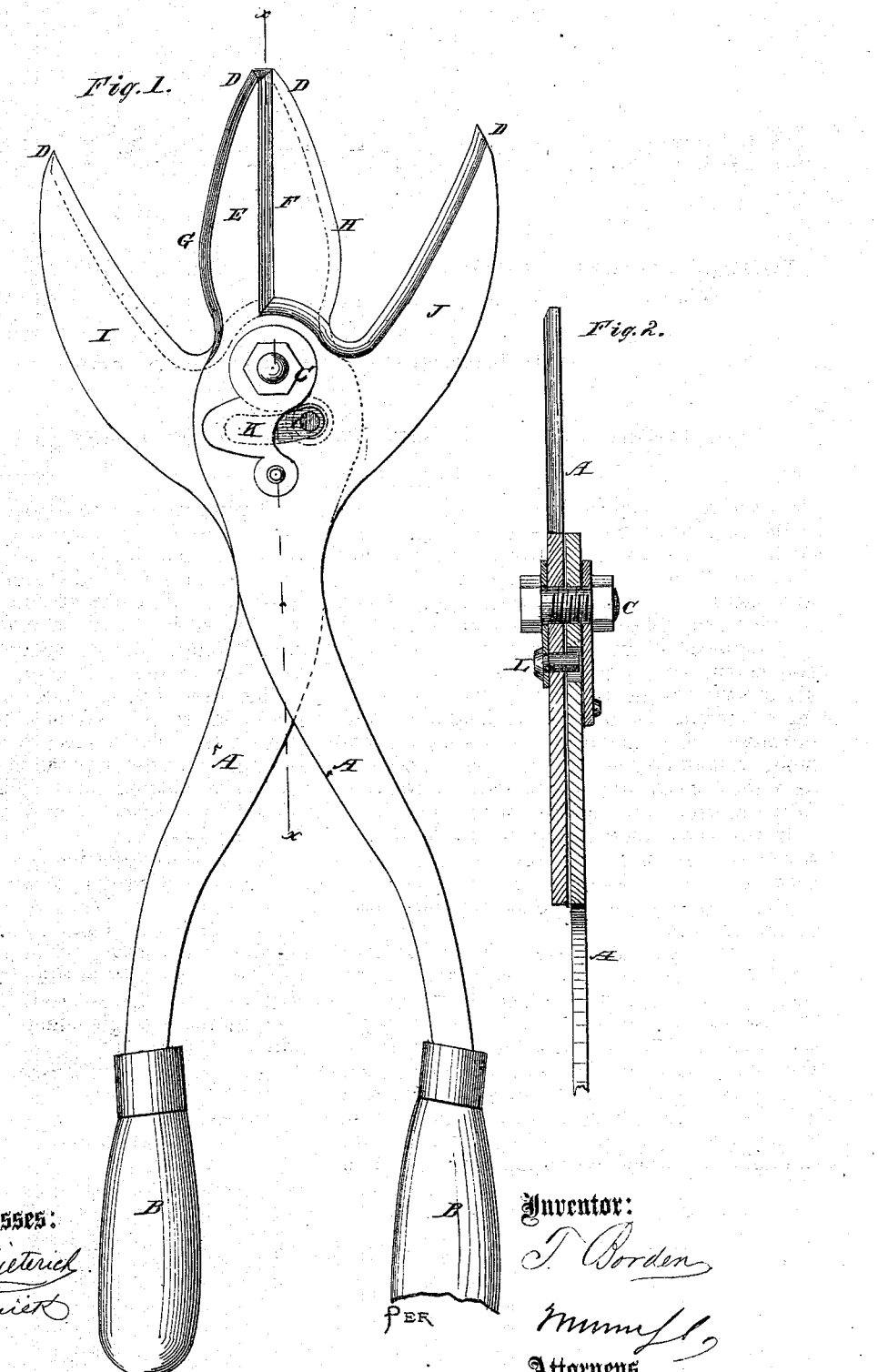

THOMAS BORDEN, OF SQUANCUM, NEW JERSEY, ASSIGNOR TO HIMSELF, DAVID P. KISNER, AND THOMAS HULETT, OF SAME PLACE.

IMPROVEMENT IN PRUNING-SHEARS.

Specification forming part of Letters Patent No. 136,209, dated February 25, 1873.

*To all whom it may concern:*

Be it known that I, THOMAS BORDEN, of Squancum, in the county of Monmouth and State of New Jersey, have invented a new and useful Improvement in Pruning-Shears, of which the following is a specification:

The object of this invention is to provide a convenient and improved shears for pruning shrubbery, designed more especially for pruning or cutting hedges, but applicable to other purposes. The invention consists in a new mode of making four blades work together so as to form three pairs of cutters, as hereinafter fully described and pointed out in the claim.

In the accompanying drawing, Figure 1 is a view of my improved shears. Fig. 2 is a section of Fig. 1 taken on the line $x\ x$.

Similar letters of reference indicate corresponding parts.

A A represent the levers; B B, the handles. C is the fulcrum-bolt. D represents the blades which form the cutting-edges of the shears. The two central blades E and F work together the same as the cutting-blades of ordinary shears, but these blades have two edges each. The outer edges G and H work in connection with the branch blades I and J. In one of the levers near the fulcrum-pin is a recess, K, and through the other lever a lug-rivet, L, which rivet projects so as to enter the recess K and form a stop to limit the action of the levers. By this construction three pairs of cutting-edges are formed, and the operator has really three pairs of shears for one pair of handles; but the shears may be made with but one branch blade, and consequently there would be but two pairs of cutting-edges.

The outer cutting-blades may be in any desired form so as to adapt them for every kind of pruning. The edges are readily sharpened and kept in order, but the main advantage is, the outer cutting-edges may be formed or curved for a variety of applications, positions, and purposes.

Having thus described my invention, I claim as new and desire to secure by Letters Patent—

As an article of manufacture, a pair of pruning-shears, consisting of the levers A A C provided with two double-edged blades in the middle that work against each other and respectively against a single-edged blade on each outside, as described.

THOMAS BORDEN.

Witnesses:
 ROBERT MILLER,
 J. C. STOKY.